(12) United States Patent  
Mossman

(10) Patent No.: US 7,937,918 B1
(45) Date of Patent: May 10, 2011

(54) DRIVE ARRANGEMENT FOR CORN HEAD EQUIPPED WITH OR WITHOUT A CORN STALK CHOPPER

(75) Inventor: Michael W. Mossman, Silvis, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/870,243

(22) Filed: Aug. 27, 2010

(51) Int. Cl.
*A01D 69/08* (2006.01)

(52) U.S. Cl. .................................................. 56/11.7
(58) Field of Classification Search .............. 56/11.7, 56/11.9, 11.5, 14.2, 98; 192/56.6, 59, 70.12, 192/21, 101, 48.91; 464/17, 48, 25
See application file for complete search history.

(56) References Cited

U.S. PATENT DOCUMENTS

| 1,883,402 | A | * | 10/1932 | Ronning et al. | 56/10.3 |
| 3,462,928 | A | | 8/1969 | Schreiner et al. | |
| 3,488,980 | A | * | 1/1970 | Burrough | 464/25 |
| 3,643,767 | A | * | 2/1972 | Fleming | 192/21 |
| 3,797,621 | A | * | 3/1974 | James | 464/38 |
| 3,858,384 | A | | 1/1975 | Maiste et al. | |
| 3,982,385 | A | * | 9/1976 | Hyman | 56/106 |
| 4,227,366 | A | | 10/1980 | Pucher | |
| 4,244,162 | A | * | 1/1981 | Pucher | 56/14.2 |
| 6,470,658 | B1 | * | 10/2002 | Wubbels | 56/11.7 |
| 6,699,130 | B2 | * | 3/2004 | Wubbels | 464/17 |
| 6,902,485 | B2 | * | 6/2005 | Wubbels | 464/17 |
| 7,739,861 | B2 | * | 6/2010 | Mackin | 56/10.2 G |

* cited by examiner

*Primary Examiner* — Árpád Fábián-Kovács

(57) ABSTRACT

A plurality of corn head row units are mounted in side-by-side relationship to each other, with each row unit including a first gear case containing a gear train coupled for driving two forwardly projecting stalk roll drive shafts and two gathering chain drive shafts supported by the gear case. Located beside the first gear case is a second gear case containing a second gear train coupled driving a stalk chopper drive shaft supported by, and projecting downwardly from, the second gear case. A main power shaft extends through a rear region of the first and second gear cases and carries a dual direction slip clutch providing overload protection for the first and second gear cases. When a stalk chopper is not used, the slip clutch is arranged for establishing overload protection for an adjacent second row unit gear case.

9 Claims, 4 Drawing Sheets

DRIVE ARRANGEMENT FOR CORN HEAD EQUIPPED WITH OR WITHOUT A CORN STALK CHOPPER

FIELD OF THE INVENTION

The present invention relates to drive arrangements for the row units and corn stalk chopper of corn heads, and, more particularly, relates to a drive arrangement for each row unit and associated stalk chopper.

BACKGROUND OF THE INVENTION

The current practice of no-till farming results in considerable plant residue being left on the field after a previous crop is harvested. This residue is especially thick when the previous crop is corn and managing this corn residue has become a big challenge. In order to promote residue deterioration, various ways of breaking down the residual corn stalks have been developed including placing chopping knife rollers and/or shredder rollers or rotary flail shredders beneath the row unit deck plates.

A known corn stalk residue treating system has been marketed by Deere and Company as the 600C StalkMaster™. This treating system includes stalk rolls located side-by-side beneath the deck plates of the row unit, with each roll including a plurality of longitudinally extending blades spaced angularly about the roll axis, with the blades of the rolls cooperating so as to engage and pull the stalks downward while crimping them along their lengths. A flail shredder including two pivotally mounted knives or blades is mounted for cutting the stalks cleanly, once the ears have been removed, so as to leave only a cleanly cut, short stubble rooted to the ground. A first gear case is provided for connecting driving power to the gathering chains and stalk rolls carried by each row unit, while a separate second gear case is provided for connecting driving power to the flail shredder. The first and second gear cases are respectively protected from overloads caused by the associated driven components coming into contact with rocks and other obstructions by first and second internal radial pin slip clutches located adjacent the gear cases on a power input shaft passing through both gear cases.

While the above-noted Deere residue treating system works well, it has the drawback that there is insufficient space available along the drive input shaft for slip clutches of adequate capacity to be used if the corn head is set up for harvesting narrow row corn. Also, the present Deere residue treating system is not easily switched between chopping and non-chopping modes.

SUMMARY OF THE INVENTION

The present invention relates to corn heads for agricultural combines and more specifically relates to drive arrangements for such corn heads as may, or may not be, equipped with choppers.

An object of the invention is to provide a relatively compact drive arrangement for either driving the stalk rolls, gathering chains and chopper of each row unit of a corn head, or for driving two row units in the absence of a chopper, with the drive arrangement including a single slip clutch for protecting the drive elements of the drive arrangement.

The foregoing object is accomplished, in a first embodiment, by providing a slip clutch having a central hub mounted for rotation with a main power shaft and having an outer cylindrical shell coupled to the hub by a spring-engaged slip surface arrangement, the shell having opposite ends respectively secured to first and second output couplers respectively coupled to first and second tubular input drive shafts mounted for rotation about the main power shaft and respectively providing drive inputs either to a row unit drive case and an associated chopper blade drive case, when a chopper blade is associated with each drive unit, or to the row unit drive cases of adjacent row units in the absence of the corn head being equipped with chopper blades.

The foregoing and other objects of the invention will be apparent from a reading of the ensuing description together with the appended drawings.

DESCRIPTION OF THE PREFERRED EMBODIMENT

Figure 1:
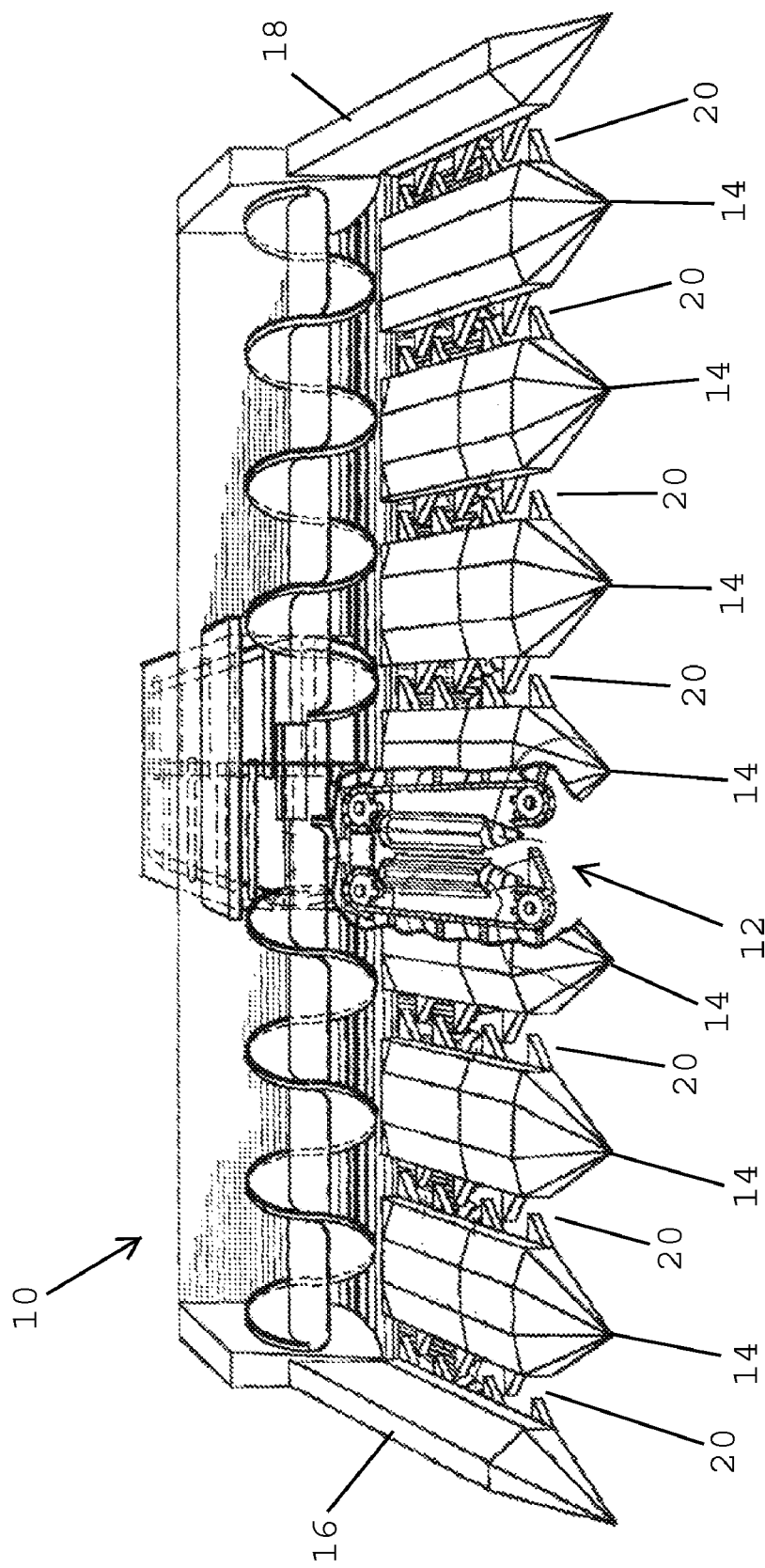
FIG. 1 is a schematic front view of a corn head for an agricultural combine including row units with which the present invention is particularly adapted for use.

Referring now to FIG. 1, there is shown a corn head 10 including a transversely extending frame (not shown) across the width of which is attached eight identical, forwardly projecting row units of which a major portion of one is shown at 12. The row units 12 are disposed in side-by-side relationship to each other and are spaced apart a distance commensurate with that of the spacing between adjacent rows of corn to be harvested. The row units 12 each include a support frame (not shown), with it being noted that it is conventional to mount the frames of the row units 12 for transverse adjustment in order to accommodate corn rows spaced apart by different distances. Extending over and mounted to adjacent portions of the row unit frames are seven identical central crop dividers 14, with a right crop divider 16 being located over a right hand portion of the right row unit frame, and with a left crop divider 18 being located over a left hand portion of the left row unit frame. The crop dividers 14, 16 and 18 each serve to separate comingled corn stalks of adjacent corn rows from one another, with the crop dividers defining longitudinal passages 20 between them which are spaced from each other a distance equal to that of the corn rows to be harvested.

Figure 2:
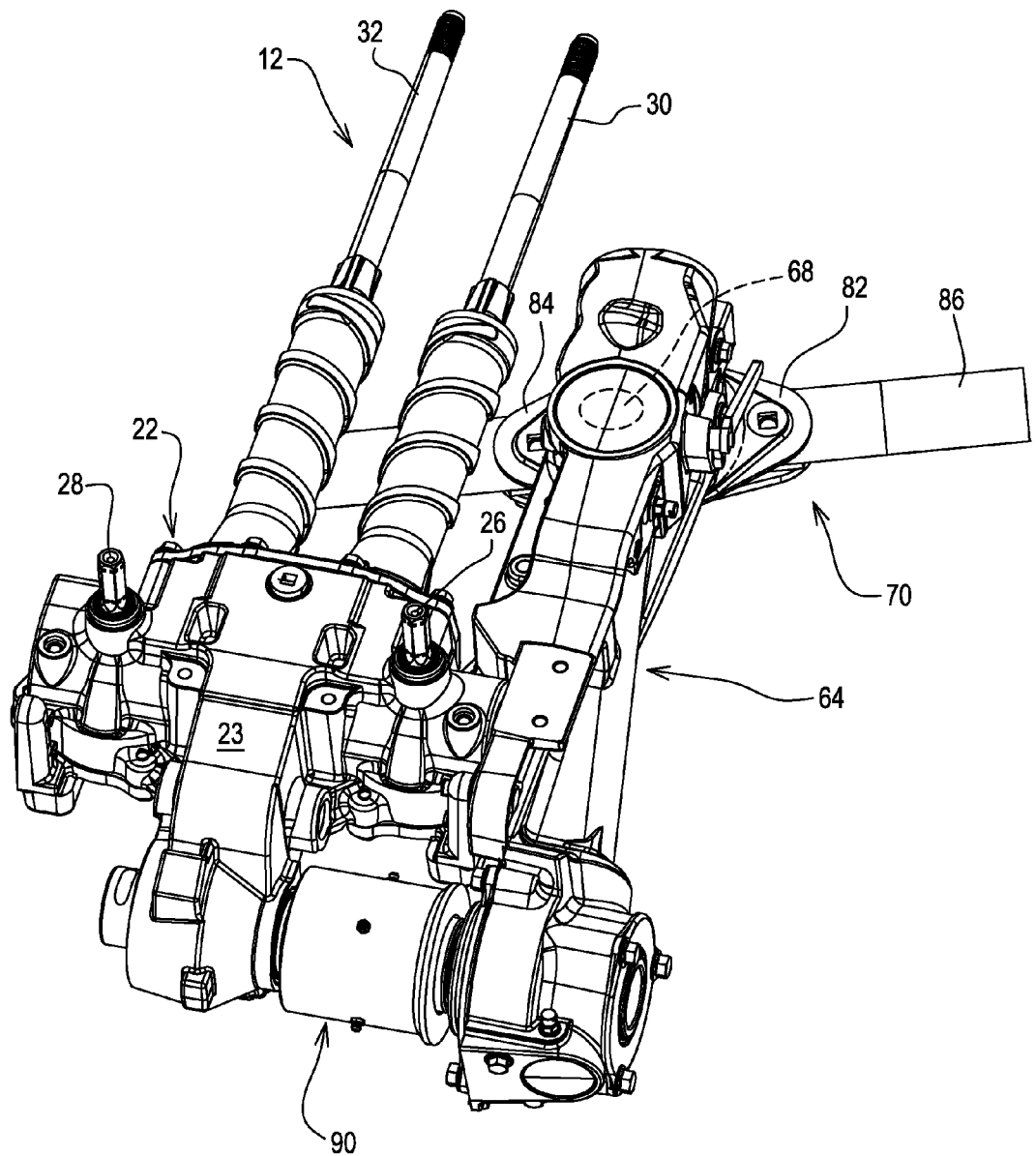
FIG. 2 is a right top perspective view showing a row unit gear case and an associated stalk chopper gear case, with a slip clutch being located between the row unit gear case on a main power shaft and having first and second output couplers respectively coupled to first and second tubular input shafts received over the power shaft and extending into the row unit and chopper gear cases.
Figure 3:
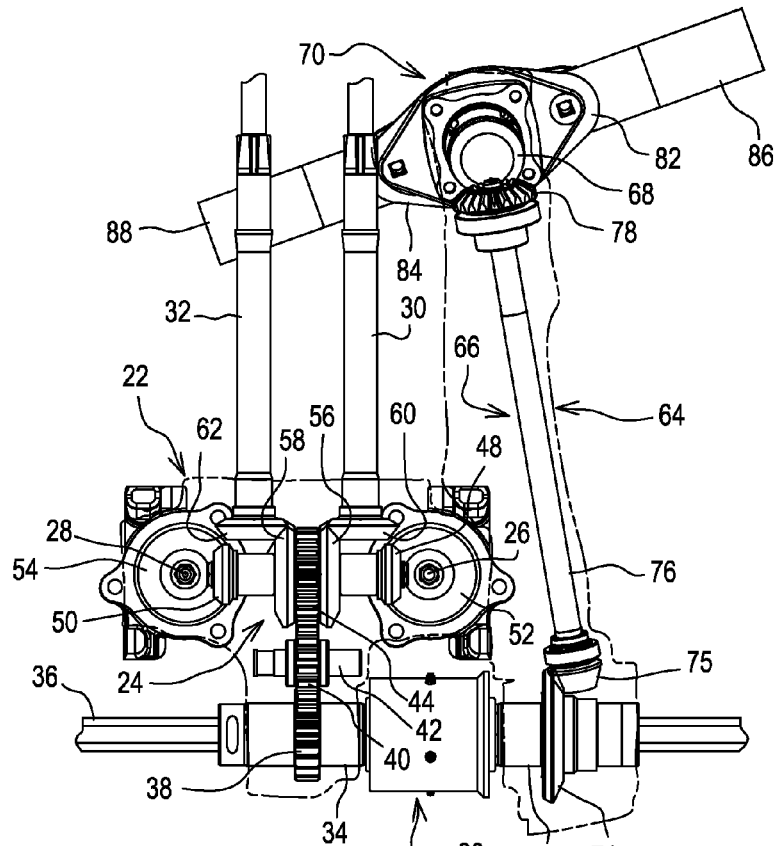
FIG. 3 is a schematic top view illustrating the gear trains contained within the row unit gear case and the associated chopper blade gear case illustrated in FIG. 2.

Referring now also to FIGS. 2 and 3, it can be seen that each row unit includes an enclosed row unit gear case 22 including a housing 23 containing a row unit gear train 24 arranged for effecting counter rotation of parallel, right and left, upwardly projecting gathering chain drive shafts 26 and 28, respectively, supported by the gear case 22. The row unit gear train 24 is also arranged for effecting counter rotation of parallel right and left, stalk roll drive shafts 30 and 32, respectively, supported in, and projecting forwardly from, a central forward wall of the gear case 22.

The gear train 24 includes a tubular input shaft 34 containing, and being mounted for rotation about, a main power shaft 36 projecting through a rear location of the row unit housing 23. A spur gear 38 is an input gear mounted on the input shaft 34 within the gear case 22 and is meshed with a transfer spur gear 40 carried by an intermediate shaft 42 also mounted for rotation in the gear case 22. The spur gear 40 is meshed with a spur gear 44 carried by a shaft 46 mounted for rotation in the gear case 22. Respectively mounted to right and left ends of the shaft 46 are right and left bevel gears 48 and 50 which are respectively meshed with bevel gears 52 and 54 carried at the lower ends of the right and left gathering chain drive shafts 26 and 28. Respectively mounted on the shaft 46 to the right and to the left of the spur gear 44 are right and left bevel gears 56 and 58 that are meshed with bevel gears 60 and 62 mounted on the rear ends of the stalk roll drive shafts 30 and 32.

It can also be seen in FIGS. 2 and 3, that a separate chopping gear case 64 is associated with the row unit gear case 22 and contains a gear train 66 arranged for driving an upright chopper blade drive shaft 68 carrying a flail type chopper blade arrangement 70 at its lower end. Specifically, the gear train 66 includes a tubular input shaft 72 mounted for rotation about the main power shaft 36 in a region extending through a rear portion of the chopper blade gear case 64. Mounted on the input shaft 72 within the rear portion of the gear case 64 is a bevel gear 74 that is meshed with a bevel gear 75 carried at the rear end of a fore- and aft extending intermediate shaft 76 that has a bevel gear 78 mounted to its forward end and meshed with a bevel gear 80 mounted to a top end of the chopper blade drive shaft 68. The chopper blade arrangement 70 comprises a hub provided with diametrically opposite, radially outwardly projecting blade mounts 82 and 84 to which flail-type chopping blades 86 and 88 are respectively mounted for pivoting about inner end locations, the blades 86 and 88 being disposed for cleanly cutting corn stalks located in a row centered between the stalk roll drive shafts 30 and 32 so as to leave a relatively short stalk stubble rooted to the ground.

Located on the main power shaft 36 at a location between the row unit gear case 22 and the chopping blade gear case 64 is a dual output slip clutch 90, which may be of any of a variety of designs capable of delivering a limited torque to respective output couplers at opposite ends of the slip clutch.

Figure 5:
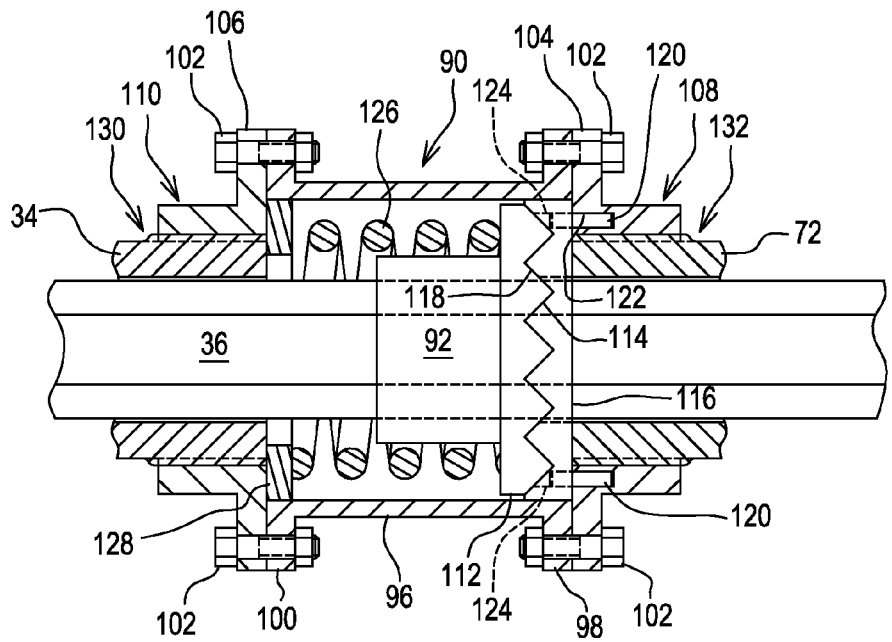
FIG. 5 is a partial longitudinal sectional view of the slip clutch illustrated in FIGS. 2-4 including a shell having opposite ends respectively connected for driving first and second output couplers.

The slip clutch 90, as depicted schematically in FIG. 5, comprises a central hub 92 surrounded by a cylindrical shell 96 having right and left mounting flanges 98 and 100, respectively, at its opposite ends coupled, as by bolts 102, to mounting flanges 104 and 106 of cylindrical, right and left output couplers 108 and 110, respectively. The hub 92 is provided with a longitudinal bore (not shown) dimensioned complementary to, and receiving the main power shaft 36, which is hexagonal in cross section, the hub 92 thus being mounted for rotating in concert with the main power shaft 36. The hub 92 includes an enlarged right end section 112 provided with an annular set of teeth 114 projecting axially toward the right. Encircling the main power shaft 36 at a location rightward of the hub 92 is a torque transfer ring 116 provided with an annular set of teeth118 shaped complementary to, and projecting axially to the left into engagement with the set of teeth 114 of the hub 92. The torque transfer ring 116 is coupled directly to the right output coupler 110 by a plurality of axially extending pins 120 received in blind bores 122 arranged in a circular pattern in the left side of the right output coupler 108 and in through bores 124 provided in the torque transfer ring 116 in alignment with the blind bores 122, noting that only two of each of the blind bores, through bores and pins are shown for the sake of clarity. The amount of torque which can be transferred through the engaged sets of teeth 114 and 118 is determined by the shape of the teeth and by a biasing force produced by a coil compression spring 126 received about the main power shaft 36 and compressed between the enlarged end section 112 of the hub 92 and a spacer ring 128 received within the shell 96 and having a left surface engaged with a right surface of the left output coupler 110.

Thus, it will be appreciated that the sets of engaged teeth 114 and 118, the spring 126 and the shell 96 cooperate to define a torque-limited connection between the slip clutch hub 92 and the slip clutch output couplers 108 and 110.

Figure 6:
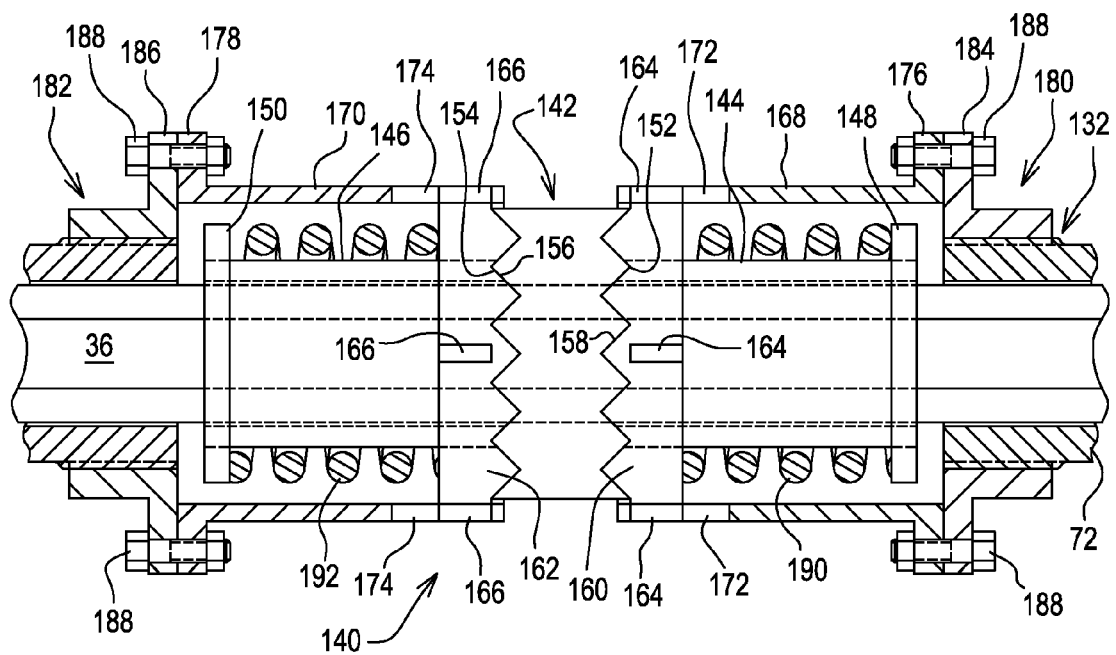
FIG. 6 is a partial longitudinal sectional view of another slip clutch, which can be used in lieu of that shown in FIG. 5, having first and second couplers at its opposite ends which are individually driven.

As can be seen in FIGS. 5 and 6, a left end region of the tubular input shaft 34 is provided with an exterior spline arrangement that is complementary to, and engaged with, an interior spline arrangement of the left output coupler 110 so as to define a spline connection 130. Similarly, an end region of the tubular input shaft 72 is provided with an exterior spline arrangement that is complementary to, and engaged with, an interior spline arrangement of the right output coupler 108 so as to define a spline connection 132.

Thus, under normal operating conditions, torque supplied by the main power shaft 36 will be transferred through the slip clutch 90 to the row unit gear case 22 and the chopping gear case 64 by way of the output couplers 110 and 108 and the associated input shafts 34 and 72. In the event that one or the other, or both, of the gear trains contained in the gear cases 22 and 64 experiences an overload, the slip clutch 90 will slip with the sets of teeth 114 and 118 slipping upon each other, the slipping continuing until power to the corn head 10 is disconnected or the condition causing the overload is abated.

Figure 4:
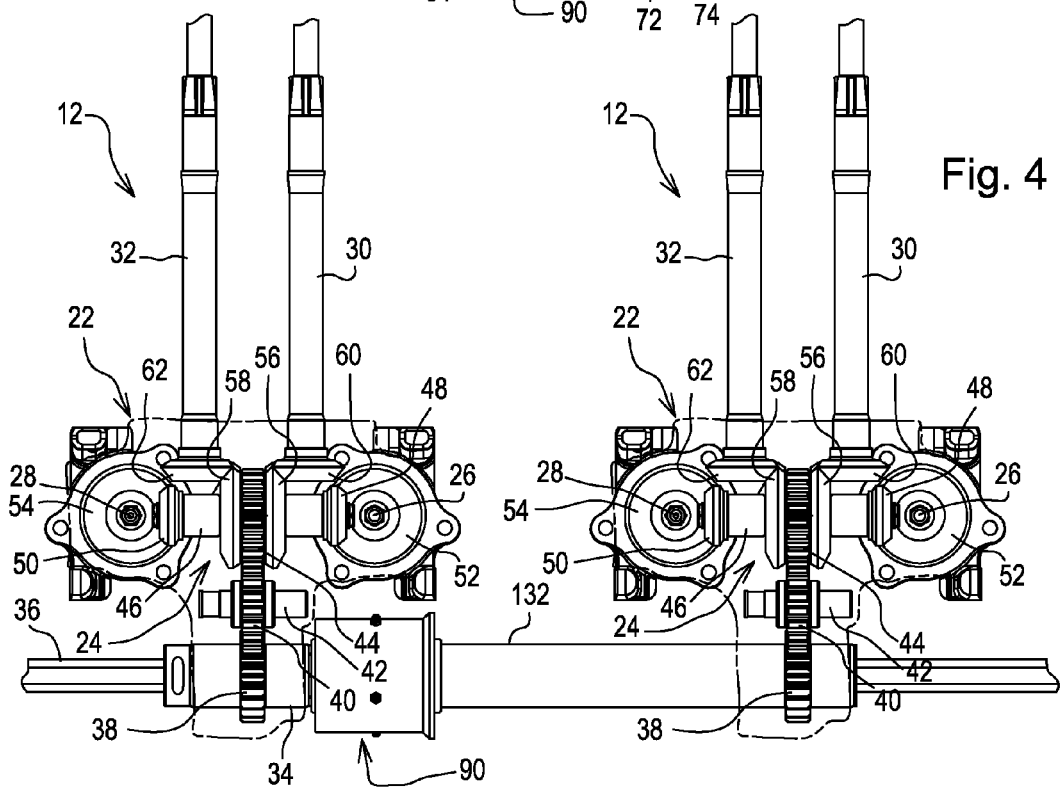
FIG. 4 is a schematic top view illustrating the gear trains contained within a pair of adjacent row unit gear cases and including respective input shafts coupled to the first and second output couplers of the slip clutch in the absence of associated chopping gear cases.

Referring now to FIG. 4, it can be seen that when no chopping is desired, the chopper gear case 64 may be omitted, with a tubular input shaft 132 replacing the input shaft 72 and extending from the right output coupler 108 of the slip clutch 90 into the row unit gear case 22 of an adjacent row unit 12, with the spur gear 38 of that row unit gear case being mounted on the input shaft 132. As an alternative to removing the chopper gear case 64, it is possible to remove only the input shaft 72 and bevel gear 74, with the input shaft 132 extending through the chopping gear case 64. It any event, it will be appreciated that the slip clutch 90 then serves to protect the adjacent row units 12 from overloads.

Referring now to FIG. 6, there is shown a slip clutch 140 used with a second embodiment of the invention. Like the slip clutch 90 described above, the slip clutch 140 includes a central cylindrical hub 142 mounted for rotation with the main power shaft 36, the hub 142 being joined to cylindrical tubular, right and left spring mounts 144 and 146, respectively, having spring retainer rings 148 and 150 screwed onto outer ends thereof. The hub 142 has right and left annular sets of axially facing teeth 152 and 154 respectively engaged with recesses between complementary, axially projecting sets of teeth 156 and 158 respectively provided at inner faces of right and left torque transfer rings 160 and 162. The torque transfer rings 160 and 162 are mounted for sliding along the spring mounts 144 and 146, and are respectively provided with right and left sets of angularly spaced, radial tabs 164 and 166. Mounted so as to respectively encircle the spring mounts 144 and 146 are right and left cylindrical shell members 168 and 170, the left end of the right shell member 168 being provided with a set of axially extending slots 172 respectively receiving the set of tabs 164 of the right torque transfer ring 160, and the right end of the left shell member 170 being provided with a set of slots 174 respectively receiving the set of tabs 166 of the right torque transfer ring 162. The shell members 168 and 170 are respectively provided with annular mounting flanges 176 and 178 at their right and left ends, with right and left output couplers 180 and 182 including annular flanges 184 and 186, respectively, mounted to the flanges 176 and 178 by bolt fasteners 188. A coil compression spring 190 is received on the spring mount 144 and is compressed between the retainer ring 148 and the right torque transfer ring 160 so as to keep the set of teeth 156 in yieldable biased engagement with the set of teeth 152. Similarly, a coil compression spring 192 is received on the spring mount 146 and is compressed between the retainer ring 150 and the left torque transfer ring 162 so as to keep the set of teeth 156 in yieldable biased engagement with the set of teeth 154.

Thus, the output couplers 180 and 182 are separately coupled to the central hub 142 by separate torque-limited connections respectively defined by the sets of teeth 152 and 158, the tabs 164 and shell 168 together with the spring 190, and the sets of teeth 154 and 156, the tabs 166 and shell 170, together with the spring 192. Stacks of Belleville washers could be substituted for the springs 190 and 192, if desired.

Installation of the slip clutch 140 on the corn head 10, when equipped for chopping, as shown in FIGS. 2 and 3, is accomplished by mounting the hub 142 for rotation with the main power shaft 36 at a location between the row unit gear case 22 and the chopper gear case 64. The output couplers 180 and 182 of the slip clutch 140 will respectively be coupled for transmitting torque to the input shaft 34 of the row unit gear case, and to the input shaft 72 of the chopper gear case 64.

Operation of the corn head with the slip clutch 140 used in lieu of the slip clutch 90, will result in each of the gear cases 22 and 64 being supplied with drive torque during normal operation. In the event that the gear train 24 of the row unit gear case 22 should experience an overload, the drive teeth 156 of the left torque transfer ring 162 will slip relative to the left set of drive teeth 154 of the hub 142 causing the left torque transfer ring 162 to shift leftward against the resistance of the spring 192 with the set of tabs 166 moving axially within the slots 174, while the set of teeth 158 of the right torque transfer ring 160 will remain engaged with the set of teeth 152 of the hub 142 so that drive torque is still supplied to the chopper gear case 64. Slippage between the sets of teeth 154 and 156 will continue until power to the main power shaft 36 is disconnected or the overload is abated. Similarly, if the gear train 66 of the chopping gear case 64 should experience an overload, slippage will take place between the set of teeth 158 of the right torque transfer ring 160 the right set of teeth 152 of the hub 142, while the left set of teeth 154 of the hub 142 will remain in driving engagement with the set of teeth 156 of the left torque transfer ring 162. Of course, if the gear trains of both of the gear cases 22 and 64 should simultaneously experience an overload, then slippage will occur between the right and left sets of teeth of the hub 142 and the sets of teeth of the right and left torque transfer rings 160 and 162, with the transfer of drive torque being interrupted to both the row unit gear train and the chopper unit gear train.

The slip clutch 140 operates in a similar manner to protect the drive trains of adjacent row units 12 when the slip clutch 140 is used to deliver drive torque to the drive trains 24 of adjacent row unit gear cases 22 when an associated chopping gear case 64 is either not present or not being currently used for chopping corn stalks.

Having described the preferred embodiment, it will become apparent that various modifications can be made without departing from the scope of the invention as defined in the accompanying claims.

The invention claimed is:

1. A corn head, comprising:
   a plurality of row units mounted in side-by-side spaced relationship across said corn head;
   each row unit including a plurality of driven stalk-engaging elements supported on a respective stalk-engaging element drive shaft;
   a first gear case supporting a first set of drive shafts for respectively driving at least some of said stalk-engaging elements of one of said row units and containing a first gear train including an input gear coupled for driving respective output gears coupled to said first set of drive shafts;
   a second gear case supporting one of either a further drive shaft supporting a respective further stalk-engaging element of said one of said row units, or with a respective second set of drive shafts for driving at least some of said stalk-engaging elements of another of said row units positioned adjacent said one of said row units, the second gear case containing a second gear train including a second input gear coupled for driving one of either said further drive shaft, or for driving a respective second set of output gears respectively associated with said second set of drive shafts;
   a main power supply shaft extending through said first and second gear cases; and
   a dual direction slip clutch having a hub mounted on said main power supply shaft between said first and second gear cases, and first and second output couplers having a torque-limited connection with said hub and being coupled to said input gears of said first and second gear boxes.

2. The corn head, as defined in claim 1, wherein said plurality of driven stalk-engaging elements includes a stalk-chopping blade arrangement; and said second gear case supporting a stalk-chopping drive shaft, with said second output coupler of said slip clutch being coupled to an input gear located in said second gear case and coupled for transferring power to said stalk-chopping drive shaft.

3. The corn head, as defined in claim 1, wherein said second gear case is identical to, and on an opposite side of said slip clutch from said first gear case.

4. The corn head, as defined in claim 2, wherein said first and second output couplers are respectively coupled, on the one hand, to said hub by first and second torque-limited connections, and on the other hand, to said first and second input gears of said first and second gear boxes, whereby said torque limited connections can slip in unison or independently depending upon a given torque load respectively imposed on said first and second torque-limited connections.

5. The corn head, as defined in claim 4, wherein said hub of said slip clutch has first and second sets of axially outwardly facing teeth at opposite ends thereof; a first torque transfer member being connected to said first output coupler and including a third set of teeth engaged with said first set of teeth, and a second torque transfer member being connected to said second output coupler and including a fourth set of teeth engaged with said second sect of teeth; and first and second springs acting between said hub and said first and second torque transfer members so as to effect limited-torque connections respectively between the first and third sets of teeth and the second and fourth sets of teeth.

6. A corn head drive arrangement, comprising:
a first gear case forming part of a first row unit and including a first housing containing a first gear train for driving a pair of forwardly projecting stalk roll drive shafts and a pair of upwardly projecting gathering chain drive shafts;
a second gear case including a second housing and being one of, identical to said first gear case and forming part of a second row unit, or being a chopping drive gear case also forming a part of said first row unit, with said second housing containing a second gear train for driving a downwardly projecting chopping drive shaft;
said first gear train including:
a transverse power transfer shaft being located centrally within said first housing;
a first pair of bevel gears being mounted on a middle region of said power transfer shaft;
a forwardly projecting pair of stalk roll shafts being mounted in said housing and respectively carrying a second pair of bevel gears respectively meshed with said first pair of bevel gears;
a third pair of bevel gears being mounted on said power transfer shaft and located one on each side of said first pair of bevel gears;
an upwardly projecting pair of gathering chain drive shafts being mounted in said housing and respectively carrying a fourth pair of bevel gears respectively meshed with said third pair of bevel gears; and
a main power shaft extending parallel to said power transfer shaft and passing through a rear region of each of said first and second housings;
a dual drive slip clutch including a central hub mounted on said main power shaft at a location between said first and second housings, with said hub including a first friction drive surface arrangement;
said slip clutch further including a torque transfer member arrangement extending axially on opposite sides of said hub and defining a second friction drive surface arrangement and a spring arrangement resiliently biasing said first and second friction drive surface arrangements into frictional engagement with each other so as to define a limited-torque connection arrangement between said hub and torque transfer member arrangement;
said slip clutch further including first and second output drive couplers secured to opposite ends of said torque transfer member arrangement in concentric relationship to said power shaft; and
first and second tubular input drive shafts being mounted for rotating freely about said main power shaft and being respectively coupled to said first and second output drive couplings of said slip clutch torque transfer member arrangement;
said first input drive shaft extending into said first housing and being coupled to said first gear train; and
said second input drive shaft extending into said second housing and being coupled to one of a gear train identical to said first gear train, or to said second gear train.

7. The dual direction slip clutch, as defined in claim 6, wherein said central hub includes first and second sets of teeth respectively projecting axially in opposite directions from opposite ends of said hub,
said torque transfer member arrangement includes first and second torque transfer members respectively provided with axially projecting third and fourth sets of teeth respectively engaged with said first and second sets of teeth, and
said biasing arrangement includes first and second coil compression springs respectively acting between said hub and said first and second torque transfer members for respectively resiliently maintaining said first and second sets of teeth in engagement with said third and fourth sets of teeth.

8. The dual direction slip clutch, as defined in claim 7, wherein said first and second torque transfer members of said slip clutch are first and second cylindrical shells, respectively, disposed concentrically about said main power shaft.

9. The dual direction slip clutch, as defined in claim 6, wherein said hub forms part of a radial pin slip clutch and contains a plurality of radially disposed bores; a plurality of pins being respectively mounted for sliding in said bores; said torque transfer member arrangement of said slip clutch defining a shell disposed about said hub and defining a recess arrangement aligned with bores and receiving an end of said plurality of pins; and said biasing arrangement including a plurality of coil compression springs respectively located in said plurality of bores and biasing said pins into engagement with said receptacle arrangement.

* * * * *